US012714613B2

(12) United States Patent
Alexander et al.

(10) Patent No.: US 12,714,613 B2
(45) Date of Patent: Aug. 25, 2026

(54) SYSTEM AND METHOD FOR PASSENGER ACCESS TO A PLATFORM

(71) Applicant: GM GLOBAL TECHNOLOGY OPERATIONS LLC, Detroit, MI (US)

(72) Inventors: Paul W. Alexander, Ypsilanti, MI (US); David W. Heyne, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 102 days.

(21) Appl. No.: 18/679,653

(22) Filed: May 31, 2024

(65) Prior Publication Data

US 2025/0367045 A1 Dec. 4, 2025

(51) Int. Cl.
*A61G 3/00* (2006.01)
*A61G 3/06* (2006.01)

(52) U.S. Cl.
CPC .................................... *A61G 3/061* (2013.01)

(58) Field of Classification Search
CPC ...................................................... A61G 3/061
USPC ........................................................... 701/49
See application file for complete search history.

(56) References Cited

U.S. PATENT DOCUMENTS 4,457,663 A 7/1984 Hems
2006/0145651 A1* 7/2006 Sullivan ................. A61G 3/061 318/727
2009/0162175 A1 6/2009 Pearson
2011/0027054 A1 2/2011 Hansen
2016/0237733 A1* 8/2016 Henseleit ................ E05B 81/04
2018/0311085 A1* 11/2018 Lacaze ................... B65G 67/24
2019/0083334 A1* 3/2019 MacPherson .......... B62D 31/02
2020/0354963 A1* 11/2020 Hoffberg ................ A61G 5/061
2021/0002937 A1* 1/2021 Zindler .................... E05F 15/73
2022/0047436 A1* 2/2022 Saucier ................... B60P 1/435
2022/0100193 A1* 3/2022 Salter ....................... E05F 15/73
2023/0184016 A1* 6/2023 Zindler ................. E05F 15/655 49/31
2023/0293365 A1* 9/2023 Cociuban ............... A61G 3/061 14/71.3
2024/0059203 A1* 2/2024 Cho ........................ B60P 1/431

* cited by examiner

*Primary Examiner* — Jelani A Smith
(74) *Attorney, Agent, or Firm* — Quinn IP Law

(57) ABSTRACT

A platform access system for a wheelchair includes a deployable ramp, actuators, a sensor, and a controller. The deployable ramp includes a first elongated beam having a toothed rack portion arranged thereon. The deployable ramp is moveable, via actuators, on a platform between a first position and a second position. The deployable ramp is vertically pivotable on an edge portion of the platform, with a second end being disposed at a second elevation. The first end of the deployable ramp is securable, via one of the plurality of actuators, to the edge portion, and the toothed rack portion of the first elongated beam is arranged to engage a sprocket of a drive wheel of a wheelchair that is disposed at the second elevation. A communication link of the ramp controller is arranged to communicate with the wheelchair to control the wheelchair to traverse the ramp and access the platform.

20 Claims, 7 Drawing Sheets

SYSTEM AND METHOD FOR PASSENGER ACCESS TO A PLATFORM

INTRODUCTION

Persons that use wheelchairs and other personal mobility devices have need to gain access to areas that are placed at different elevations from ground, including access to passenger compartments of vehicles, agricultural equipment, trailers, recreational vehicles, watercraft, etc. By way of a non-limiting example, access to passenger compartments of electrified vehicles may be restricted due to limitation in floor designs that are imposed by location of batteries in the vehicle floor.

SUMMARY

There is a benefit to providing system(s), method(s), and/or device(s) for improved access to passenger compartments of electrified vehicles and other spaces for persons that use wheelchairs or other personal mobility devices.

An aspect of the disclosure may include a platform access system for a wheelchair. In one embodiment, the platform being accessed is elevated in relation to ground level on which the wheelchair is initially located. In one embodiment, the platform being accessed is sunken in relation to ground level on which the wheelchair is initially located.

The platform access system includes a deployable ramp that is slidably arranged on the platform, a plurality of actuators, one or a plurality of sensors, and a ramp controller including a communication link. The deployable ramp includes a first elongated beam having a toothed rack portion arranged thereon with the platform being horizontally disposed at a first elevation level. The deployable ramp includes a first end and a second end. The deployable ramp is initially disposed at a first position on the platform. The ramp controller is operatively connected to the plurality of actuators, and is in communication with the sensor. The deployable ramp is moveable, via one of the plurality of actuators, on the platform between the first position that is in parallel to a longitudinal axis and a second position that is orthogonal to the longitudinal axis, with the second end of the deployable ramp extending outwardly from an edge portion of the platform in the second position. The deployable ramp is vertically pivotable, via one of the plurality of actuators, on the edge portion of the platform when in the second position, with the second end of the deployable ramp being disposed at a second elevation, which is ground level in one embodiment. The first end of the deployable ramp is securable, via one of the plurality of actuators, to the edge portion of the platform, and the toothed rack portion of the first elongated beam is arranged to engage a sprocket of a drive wheel of a wheelchair that is disposed at the second elevation. The communication link of the ramp controller is arranged to communicate with a communication device of a wheelchair.

Another aspect of the disclosure may include the ramp controller including algorithmic code, the algorithmic code being executable to control the plurality of actuators to move the deployable ramp from the first position to the second position, including the plurality of actuators being operable to slide the deployable ramp on the platform along the longitudinal axis; rotate the deployable ramp in a horizontal plane with the second end extending outwardly from the edge portion of the platform; vertically pivot the deployable ramp on the edge portion of the platform with the second end of the deployable ramp disposed at the second elevation; and secure the first end of the deployable ramp to the edge portion of the platform.

Another aspect of the disclosure may include the deployable ramp including a wheelchair locking mechanism, and the ramp controller including algorithmic code that is executable to: communicate, via the communication link, a first command to the wheelchair to traverse from the second end of the deployable ramp to the first end of the deployable ramp via the toothed rack portion of the first elongated beam in engagement with the sprocket of the drive wheel of the wheelchair; determine, via the sensor, that the wheelchair is proximal to the first end of the deployable ramp; secure, via the wheelchair locking mechanism, the wheelchair to the first end of the deployable ramp; vertically pivot, via one of the plurality of actuators, the deployable ramp to the first elevation level, with the wheelchair being disposed on the platform at the first elevation level; rotate, via one of the plurality of actuators, the deployable ramp in a horizontal plane, with the wheelchair being disposed parallel to the longitudinal axis on the platform at the first elevation level; slide, via one of the plurality of actuators, the deployable ramp on the platform to the first position; and secure, via the wheelchair locking mechanism, a portion of the wheelchair to the platform.

Another aspect of the disclosure may include the algorithmic code being executable to: release, via the wheelchair locking mechanism, the portion of the wheelchair from the platform; slide, via the one of the plurality of actuators, the deployable ramp on the platform away from the first position; rotate, via the one of the plurality of actuators, the deployable ramp in the horizontal plane, with the wheelchair being disposed perpendicular to the longitudinal axis on the platform at the first elevation level; vertically pivot, via the one of the plurality of actuators, the deployable ramp with the second end of the deployable ramp being disposed at the second elevation; release, via the wheelchair locking mechanism, the wheelchair from the first end of the deployable ramp; and communicate, via the communication link, a second command to the wheelchair to traverse from the first end of the deployable ramp to the second end of the deployable ramp via the toothed rack portion of the first elongated beam in engagement with the sprocket of the drive wheel of the wheelchair.

Another aspect of the disclosure may include the algorithmic code being executable to: vertically pivot, via the one of the plurality of actuators, the deployable ramp to the first elevation level subsequent to offloading the wheelchair onto a surface at the second elevation; rotate, via the one of the plurality of actuators, the deployable ramp in the horizontal plane; and slide, via the one of the plurality of actuators, the deployable ramp on the platform to the first position.

Another aspect of the disclosure may include the plurality of actuators being a first actuator arranged to slide the deployable ramp on the platform in parallel with the longitudinal axis, a second actuator arranged to rotate the deployable ramp on the platform; and a third actuator arranged to vertically pivot the deployable ramp on the platform.

Another aspect of the disclosure may include the platform being a portion of a vehicle.

Another aspect of the disclosure may include the platform being a portion of a moveable platform.

Another aspect of the disclosure may include the platform being disposed on a stationary platform.

Another aspect of the disclosure may include the deployable ramp including the first elongated beam, a second elongated beam, and a cross-member; wherein the first elongated beam is arranged coplanar with and in parallel with the second elongated beam; and wherein the first elongated beam is joined to the second elongated beam via the cross-member at the first end of the deployable ramp.

Another aspect of the disclosure may include the deployable ramp being vertically pivotable upward.

Another aspect of the disclosure may include the deployable ramp being vertically pivotable downward.

Another aspect of the disclosure may include a passenger access system for a vehicle or another elevated space that includes a wheelchair including a seat portion, an extendable post, a wheeled base portion, one or a plurality of sensors, and a first controller, and a deployable ramp and ramp controller. The seat portion is coupled to the wheeled base portion via the extendable post, with a first end of the extendable post pivotably coupled to the wheeled base portion at a first joint, and a second end of the extendable post being pivotably coupled to the seat portion at a second joint. The wheeled base portion includes a plurality of wheels that are arranged on a chassis, a power pack, and an electric motor. One of the plurality of wheels includes a drive wheel that includes a sprocket and is coupled to the electric motor. The deployable ramp includes an elongated beam having a rack portion arranged thereon. The sprocket of the drive wheel is meshingly engageable with the rack portion of the elongated beam of the deployable ramp. The ramp controller is arranged to monitor, via the sensor, a position of the wheelchair. The first controller is arranged to control the electric motor to rotate the sprocket of the drive wheel, control the extendable post, control the first joint between the wheeled base portion and the extendable post, and control the second joint between the seat portion and the extendable post. The first controller is also arranged to control the extendable post to control the position of the seat portion. When the sprocket of the drive wheel engages the deployable ramp, the controller controls the electric motor to rotate the sprocket of the drive wheel to meshingly engage the rack portion of the elongated beam of the deployable ramp to cause the wheelchair to traverse the deployable ramp, controls the second joint to orient the seat portion in an upright state as the wheelchair is traversing the deployable ramp, and controls the first joint, the second joint, and the extendable post to control the position of the seat portion as the wheelchair is traversing the deployable ramp.

Another aspect of the disclosure may include the first controller communicating a query, via a wireless communication system, with the second controller; and the second controller deploying the deployable ramp in response to the query from the first controller.

The above summary is not intended to represent every possible embodiment or every aspect of the present disclosure. Rather, the foregoing summary is intended to illustrate some of the aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
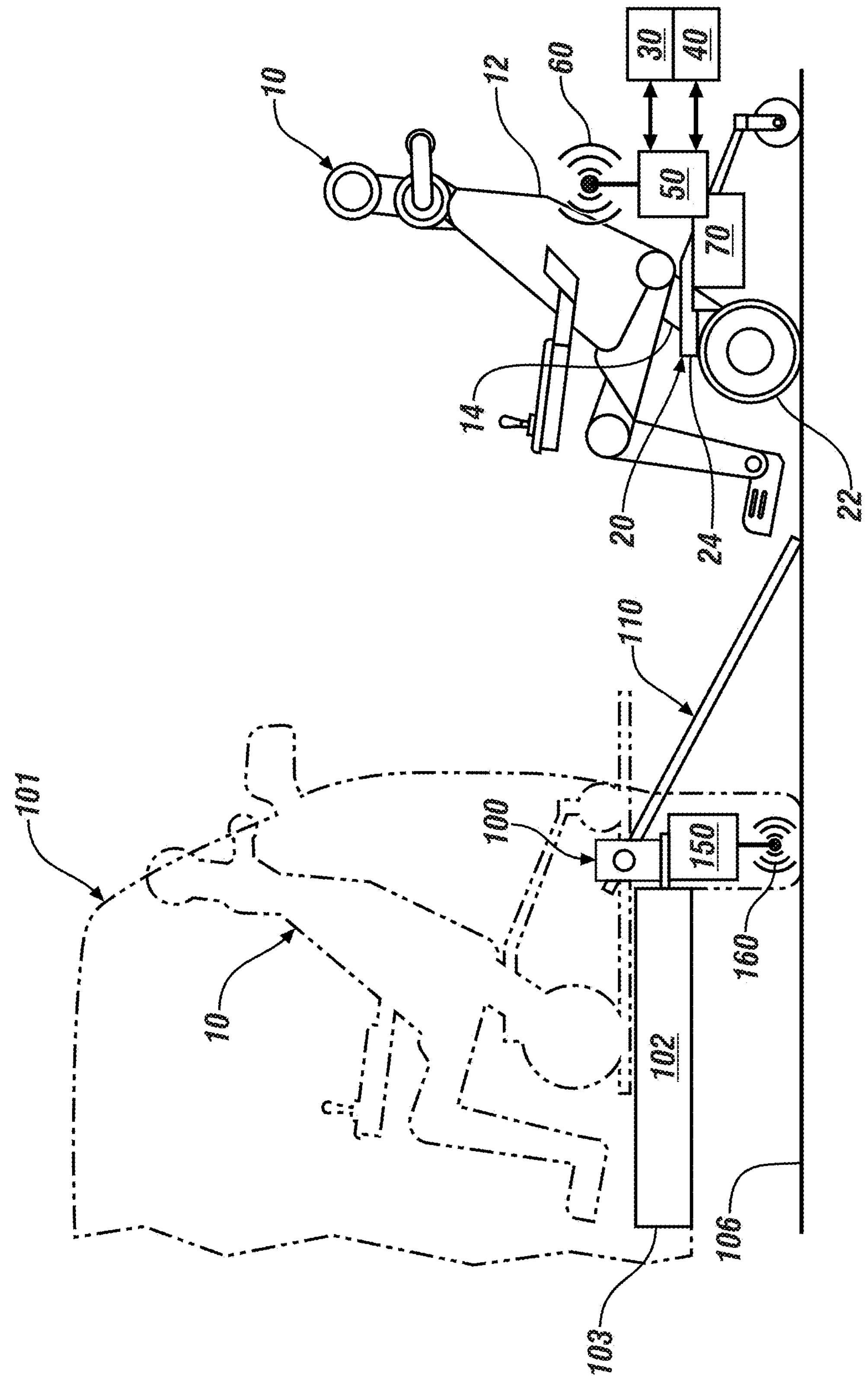
FIG. 1 schematically illustrates a side view of a platform access system for a wheelchair including a platform, and a wheelchair, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Embodiments may be described herein in terms of functional and/or logical block components and various processing steps. Such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the illustrated embodiments may be practiced in conjunction with any number of mechanical and/or electronic systems, and that the vehicle systems described herein are merely illustrative embodiments of possible implementations.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. Many alternative or additional functional relationships or physical connections may be present in an embodiment of the disclosure.

Furthermore, the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

Also, as used in the specification and the appended claims, the singular form “a,” “an,” and “the” comprise plural referents unless the context clearly indicates otherwise. For example, reference to a component in the singular is intended to comprise a plurality of components.

The use of ordinals such as first, second and third does not necessarily imply a ranked sense of order, but rather may only distinguish between multiple instances of an act or structure.

All numerical values of parameters (e.g., of quantities or conditions) in this specification, including the appended claims, are to be understood as being modified in all instances by the term “about” whether or not “about” actually appears before the numerical value. “About” indicates that the stated numerical value allows some slight imprecision (with some approach to exactness in the value; about or reasonably close to the value; nearly). If the imprecision provided by “about” is not otherwise understood in the art with this ordinary meaning, then “about” as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

As employed herein, terms such as “vertical”, “horizontal”, “left”, “right”, “upper”, “lower”, and similar expressions are non-limiting terms that merely describe the various elements as illustrated in the Figures, and are not intended to limit the scope of the disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. Furthermore, alternative or additional functional relationships or physical connections may be present in an embodiment of the present disclosure.

Referring now to the drawings, which are provided for the purpose of illustrating certain embodiments only and not for the purpose of limiting the same, FIGS. 1, et seq., schematically illustrate elements of a platform access system 100 for a wheelchair (or other personal mobility device) 10, wherein the platform 102 that is to be accessed is at a first elevation 103, and the wheelchair 10 is at ground level 106, which is at a second elevation that differs from the first elevation 103. In one embodiment, and as illustrated, the first elevation 103 is above, or vertically higher than ground level 106. It is appreciated that the first elevation 103 of the platform 102 that is to be accessed may instead be sunken below, or vertically lower than ground level 106.

Figure 2A:
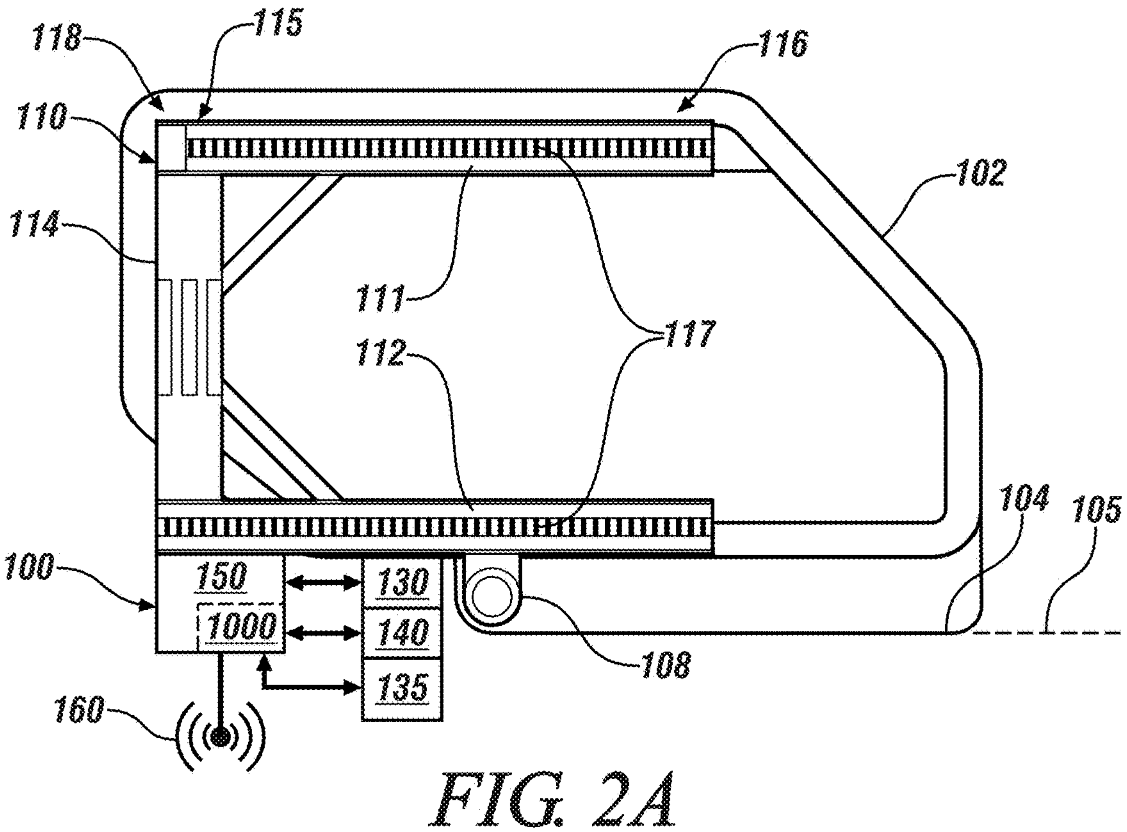
FIGS. 2A, 2B, 2C, and 2D schematically illustrate a top view of a platform access system, including various stages of deployment of a deployable ramp, in accordance with the disclosure.

Referring to FIGS. 1 and 2A, the platform 102 and the platform access system 100 are arranged on a motorized vehicle 101 in one embodiment, e.g., an electrified vehicle. The vehicle 101 may include, but not be limited to a mobile platform in the form of a commercial vehicle, industrial vehicle, recreational vehicle, agricultural vehicle, passenger vehicle, aircraft, watercraft, train, all-terrain vehicle, personal movement apparatus, robot and the like to accomplish the purposes of this disclosure. In one embodiment, the platform 102 and the platform access system 100 are arranged on a mobile device such as a trailer or a camper. In one embodiment, the platform 102 and the platform access system 100 are arranged on a stationary device, such as an elevated booth, a house, a loading dock, etc.

The platform access system 100 includes a deployable ramp 110 that is slidably arranged on the platform 102, a plurality of actuators 130 that are arranged to urge various movements of the deployable ramp 110, one or multiple wheelchair locking mechanisms 135, one or multiple sensors 140 that are arranged to monitor position(s) and/or orientations of the deployable ramp 110 and/or a proximal wheelchair 10, and a ramp controller 150 having a wireless communication link 160 for communicating with the proximal wheelchair 10. The ramp controller 150 is in communication with the one or multiple sensors 140 that are arranged to monitor the deployable ramp 110, and is operatively connected to the plurality of actuators 130 and the wheelchair locking mechanisms 135 to control activation thereof. The ramp controller 150 also includes a wheelchair onboarding process 1000, described in detail with reference to FIG. 5, which includes one or multiple algorithms for controlling the deployable ramp 110 to onboard a proximal wheelchair 10. In one embodiment, the ramp controller 150 may be in communication with a global positioning system (GPS) sensor, which may be a part of the platform access system 100, or may be integrated into the motorized vehicle 101.

The platform 102 includes an edge portion 104, which defines a longitudinal axis 105. The platform 102 includes a pivot post 108. In one embodiment, the pivot post 108 includes the wheelchair locking mechanism 135. The deployable ramp 110 is configured to be disposed in a stowed position 118 (illustrated with reference to FIG. 2A), and in an in-use position 119 (illustrated with reference to FIG. 2D). The deployable ramp 110 is configured to traverse between the stowed position 118 and the in-use position 119 (illustrated, e.g., with reference to FIGS. 2B and 2C).

The deployable ramp 110 includes a first elongated beam 111 that is arranged coplanar with and in parallel with a second elongated beam 112, with the first elongated beam 111 being joined to the second elongated beam 112 via a cross-member 114 at a first end 115 of the deployable ramp 110. This arrangement of first and second elongated beams 111, 112 provides an open center ramp design that facilitates steep incline angles of the deployable ramp 110 and associated ascent/descent of the wheelchair without having the occupant's feet encountering a connecting plane that would otherwise be there (as found on a conventional ramp). In one embodiment, there may be another cross-member arranged at a second, opposite end 116 of the deployable ramp 110, and/or intermediate between the first and second ends 115, 116 of the deployable ramp 110. The first elongated beam 111 has a toothed rack portion 117 that extends from the first end 115 to the second end 116 thereof in one embodiment. In one embodiment, both the first and second elongated beams 111, 112 have respective toothed rack portions 117 arranged thereon. The toothed rack portion(s) 117 are designed, arranged, and/or configured to meshingly engage and interact with a sprocket 26 that is arranged on a drive wheel 24 of the wheelchair 10. This arrangement provides, in one embodiment, a direct drive, geared system that achieves a fixed linear displacement of the wheelchair 10 along the ramp 110 in response to a rotational or angular displacement of the drive wheel 24 of the wheelchair 10 when the sprocket 26 is meshingly engaged with the toothed rack portion 117 of the first elongated beam 111.

The deployable ramp 110 is arranged on the platform 102 to move between the stowed position 118 and the in-use position 119. Such movement includes sliding the deployable ramp 110 on the platform 102, rotating the deployable ramp 110 in the horizontal plane around the pivot post 108 to cause the second end 116 to extend outwardly from the edge portion 104 of the platform 102, vertically pivoting the deployable ramp 110 to allow the second end 116 to rest upon ground level 106, and securing the first end 115 of the deployable ramp 110 to the edge portion 104 of the platform 102. Such movement includes reversing the aforementioned motions.

The plurality of actuators 130 are arranged to urge the deployable ramp 110 to move between the stowed position 118 and the in-use position 119. Actions of the plurality of actuators 130 includes sliding the deployable ramp 110 on the platform 102, rotating the deployable ramp 110 around the pivot post 108 to cause the second end 116 to extend outwardly from the edge portion 104 of the platform 102, vertically pivoting the deployable ramp 110 until the second end 116 is resting upon ground level 106, and securing the first end 115 of the deployable ramp 110 to the edge portion 104 of the platform 102. The aforementioned actions of the plurality of actuators 130 are reversible to return the deployable ramp 110 to the stowed position 118, with or without an embodiment of the wheelchair 10 secured thereto. In one embodiment, the plurality actuators 130 includes a first actuator arranged to slide the deployable ramp on the platform 102 in parallel with the longitudinal axis 105, a second actuator arranged to rotate the deployable ramp on the platform, and a third actuator arranged to vertically pivot the deployable ramp on the platform 102.

The plurality of actuators 130 may include, by way of non-limiting examples, electromagnetic solenoids, pneumatic cylinders, hydraulic cylinders, electric linear actuators, etc. One or more of the plurality of actuators 130 may include position feedback sensors for internal control thereof, and/or for providing position feedback to the ramp controller 150.

The one or a plurality of sensors 140 may include position sensors, proximity sensors, etc., that employ one or more of Hall effect, ultrasound, capacitive coupling, optical, inductive, magnetostrictive technology, or another technology. The plurality of sensors 140 may include a localized position sensor that indicates the wheelchair 10 is located and/or positioned at the end of the ramp 110. The plurality of sensors 140 may also include an on-vehicle camera that is arranged to monitor the ramp 110 with and without the wheelchair 10 to determine a path of the ramp 110 and wheelchair 10 as the wheelchair 10 is entering or exiting the vehicle 101.

The ramp controller 150 includes a wireless communication link 160, which may be a stand-alone system or part of a wireless network, which may be a short-range network or a long-range network. The wireless network may be a communication BUS, which may be in the form of a serial Controller Area Network (CAN-BUS). The wireless network may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of wireless links may be employed.

Figure 4:
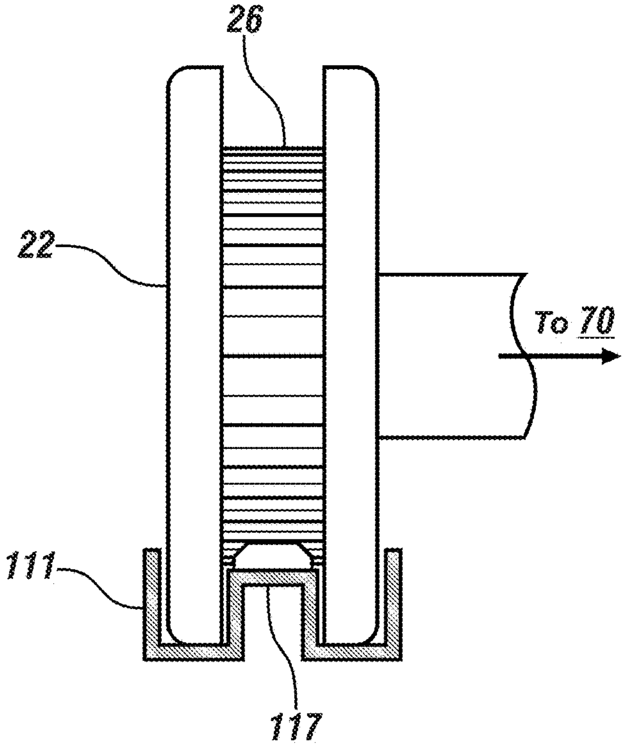
FIG. 4 schematically illustrates an end view of an embodiment of a drive wheel and sprocket for a wheelchair, in accordance with the disclosure.

The wheelchair 10 includes, in one embodiment, a seat portion 12, an extension mechanism 14, a wheeled base portion 20, one or multiple sensors 30, one or multiple actuators 40, a wheelchair controller 50, and an electric propulsion system 70. The seat portion 12 is coupled to the wheeled base portion 20 via the extension mechanism 14, with a first end of the extension mechanism 14 being pivotably coupled to the wheeled base portion 20 at a first joint, and a second end of the extension mechanism 14 being pivotably coupled to the seat portion at a second joint. The wheeled base portion 20 includes a plurality of wheels 22 that are arranged on a chassis 24, and the electric propulsion system 70, which includes a power pack and an electric motor in one embodiment. As shown with reference to FIG. 4, one of the plurality of wheels 22 includes a drive wheel 22 that includes a sprocket 26, and is coupled to the electric propulsion system 70. The sprocket 26 of the drive wheel 22 is meshingly engageable with the rack portion 117 of the elongated beam 111 of the deployable ramp 110. In one embodiment, the interaction between the sprocket 26 and the rack portion 117 is a direct drive, geared system that achieves a fixed linear displacement of the wheelchair 10 on the deployable ramp 110 in response to a rotational or angular displacement of the drive wheel 22 by the electric propulsion system 70. It is appreciated that the wheelchair 10 described herein may communicate with and interact with the platform access system 100 with or without a person being in the wheelchair 10, i.e., an occupant.

Alternatively, the wheelchair 10 may be arranged as a motorized walker having waist-level handgrips, a collapsible seat, a stowage container, and/or other elements associated with walkers.

Alternatively, the wheelchair 10 may be arranged as a cargo pod having a level of autonomous operation outside of the vehicle 101 or away from the platform 102, with or without interaction with a proximal person.

The wheelchair controller 50 is in communication with the one or multiple sensors 30, and is operatively connected to the one or multiple actuators 40. The wheelchair controller 50 includes a wireless communication link 60, with which it is able to communicate with the wireless communication link 160 of the ramp controller 150 via the aforementioned wireless network. In one embodiment, the wheelchair controller 50 may include a GPS sensor.

The wheelchair controller 50 is able to monitor, via the one or multiple sensors 30, the location of the wheelchair 10 and/or the proximity of the wheelchair 10 to the deployable ramp 110 of the platform access system 100.

Operation of the platform access system 100 in conjunction with the wheelchair 10 is described with reference to FIG. 5.

The wheelchair controller 50 is arranged to control the electric motor to rotate the sprocket of the drive wheel, control the extension mechanism, control the first joint between the wheeled base portion and the extension mechanism, and control the second joint between the seat portion and the extension mechanism. The wheelchair controller is also arranged to control the extension mechanism to control the position of the seat portion. When the sprocket of the drive wheel engages the deployable ramp, the wheelchair controller controls the electric motor to rotate the sprocket of the drive wheel to meshingly engage the rack portion of the elongated beam of the deployable ramp to cause the wheelchair to traverse the deployable ramp, controls the second joint to orient the seat portion in an upright state as the wheelchair is traversing the deployable ramp, and controls the first joint, the second joint, and the extension mechanism to control the position of the seat portion as the wheelchair is traversing the deployable ramp.

The ramp controller 150 communicates with the wheelchair controller 50 of the proximal wheelchair 10 via the wireless communication link 160, and controls the plurality of actuators 130 to deploy the deployable ramp 110 from the stowed position 118 to the in-use position 119, using information from the sensor(s) 140.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

FIG. 2A depicts the deployable ramp 110 in the stowed position.

Figure 2B:
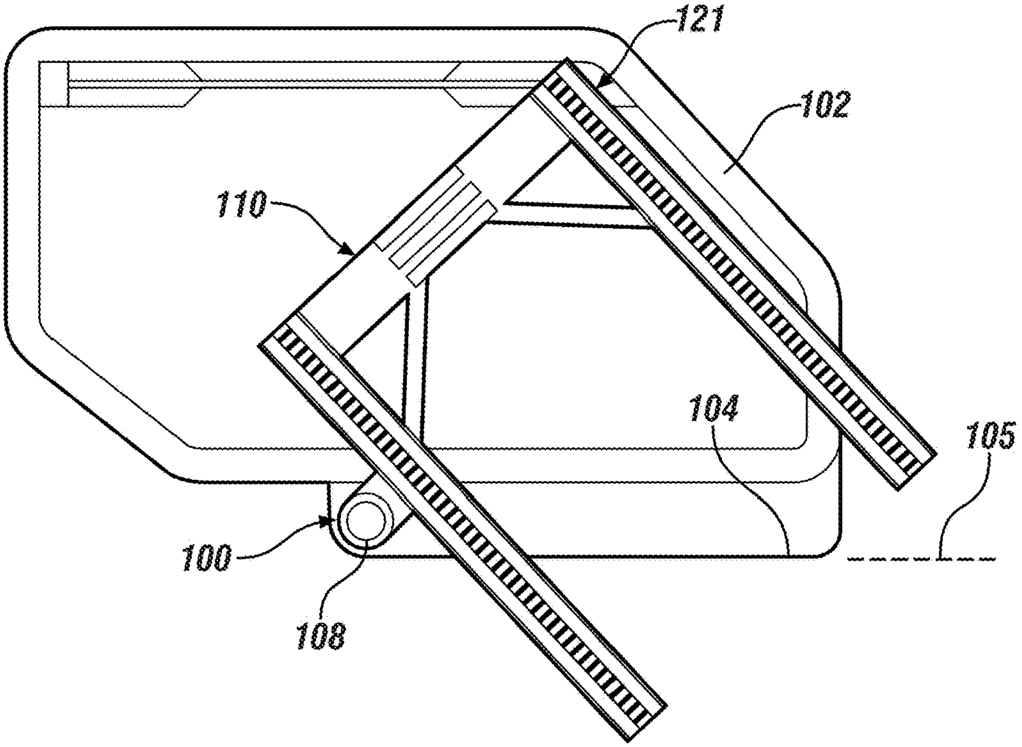

FIG. 2B depicts the deployable ramp 110 during a first portion of deployment 121, as the deployable ramp 110 is rotating about the pivot post 108, after having slid rearward along the longitudinal axis from the stowed position.

Figure 2C:
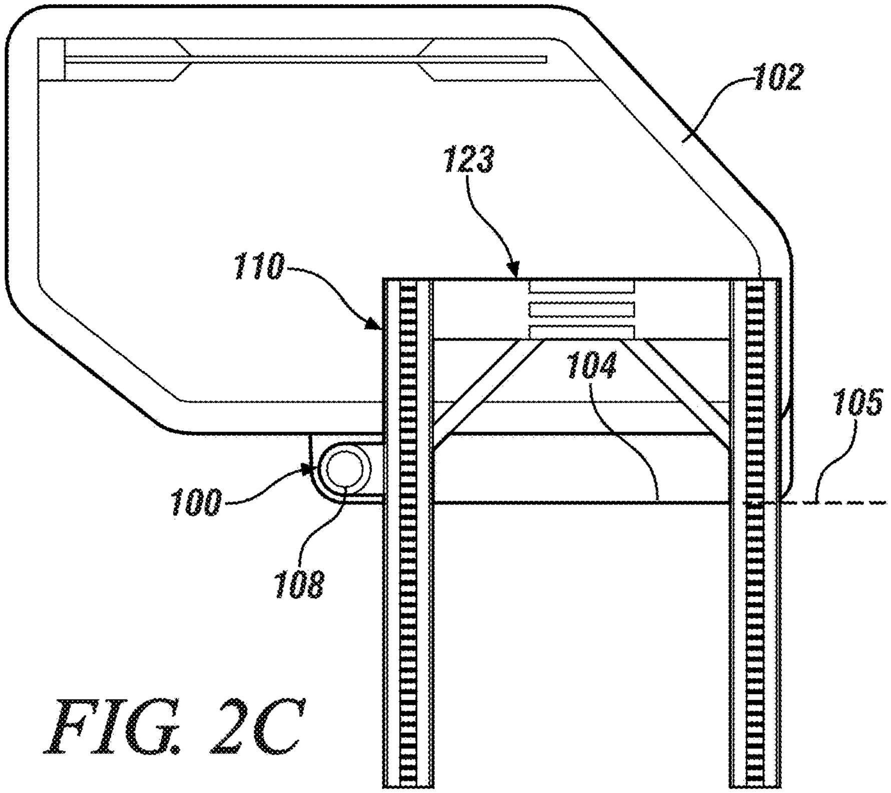

FIG. 2C depicts the deployable ramp 110 during a second portion of deployment 123, as the deployable ramp 110 has rotated about the pivot post 108 to be orthogonal to the edge portion 104.

Figure 2D:
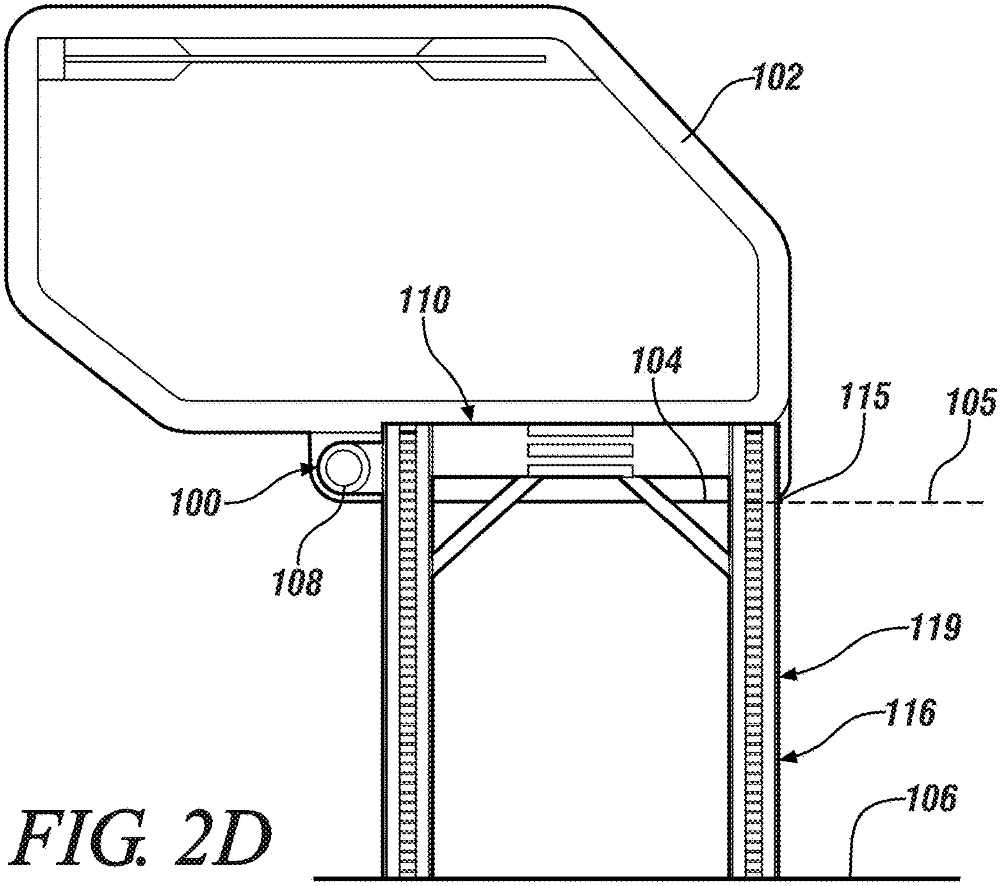
Figure 3A:
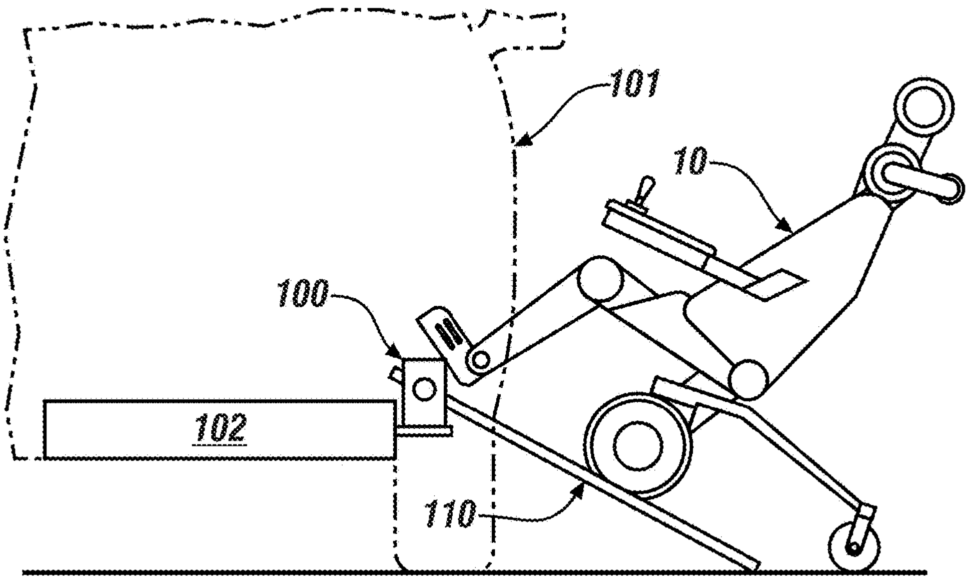
FIGS. 3A, 3B, 3C, 3D, and 3E schematically illustrate a front view of a platform access system including a deployable ramp, and wheelchair, in accordance with the disclosure.
Figure 3B:
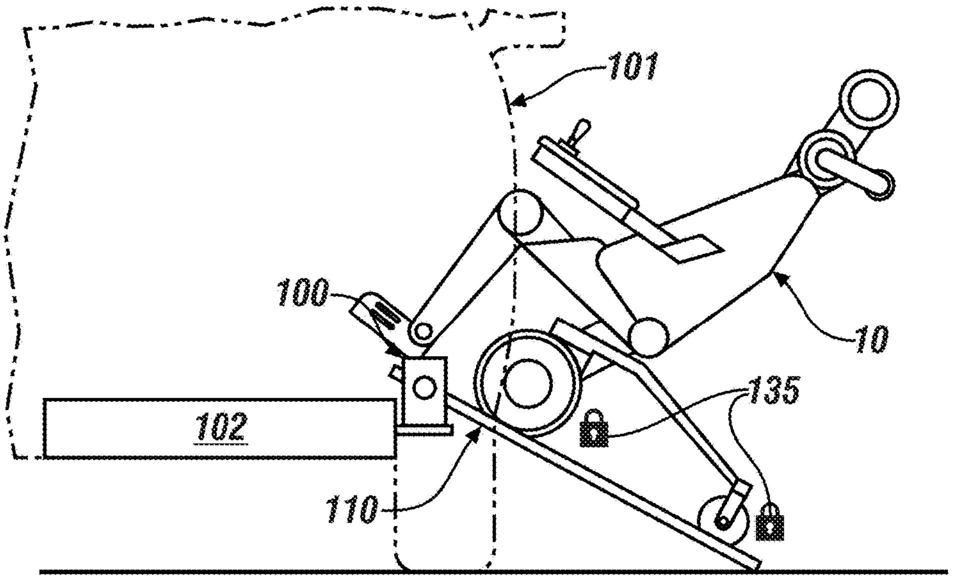
Figure 3C:
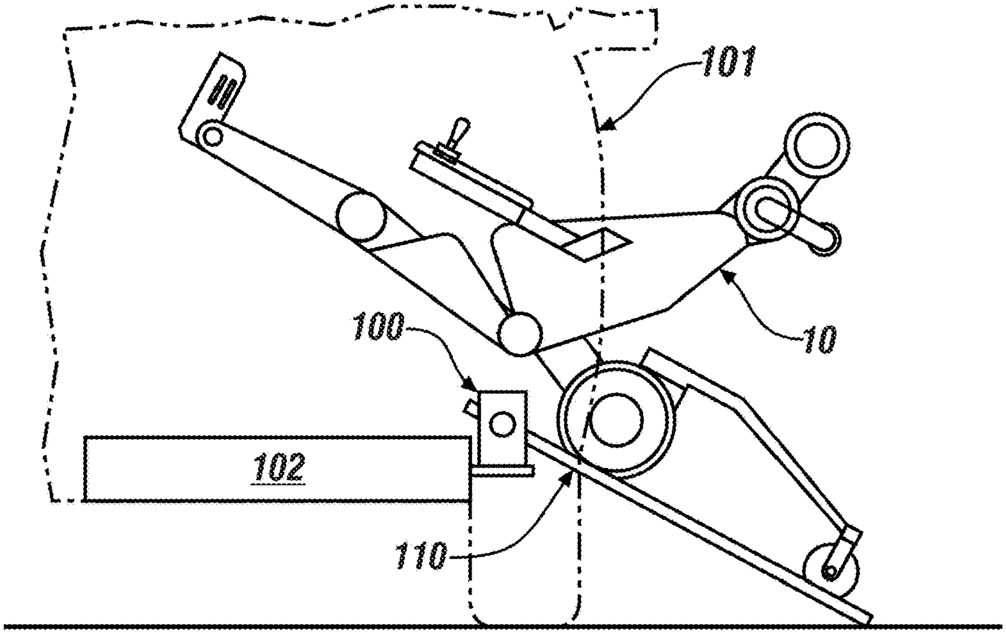
Figure 3D:
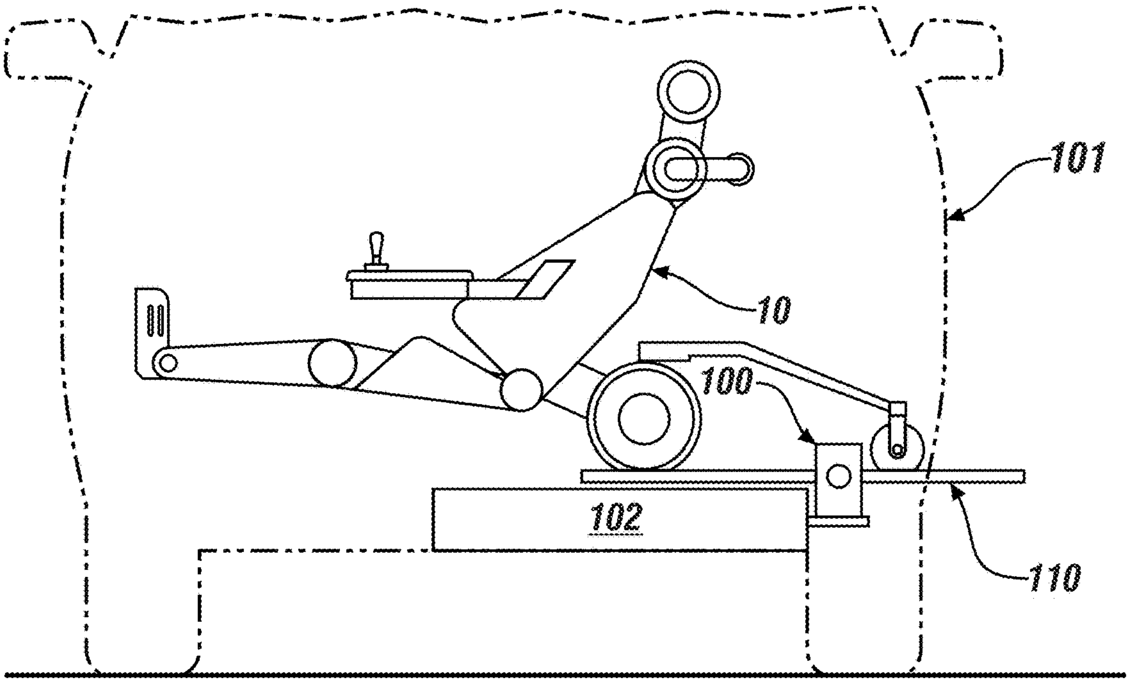
Figure 3E:
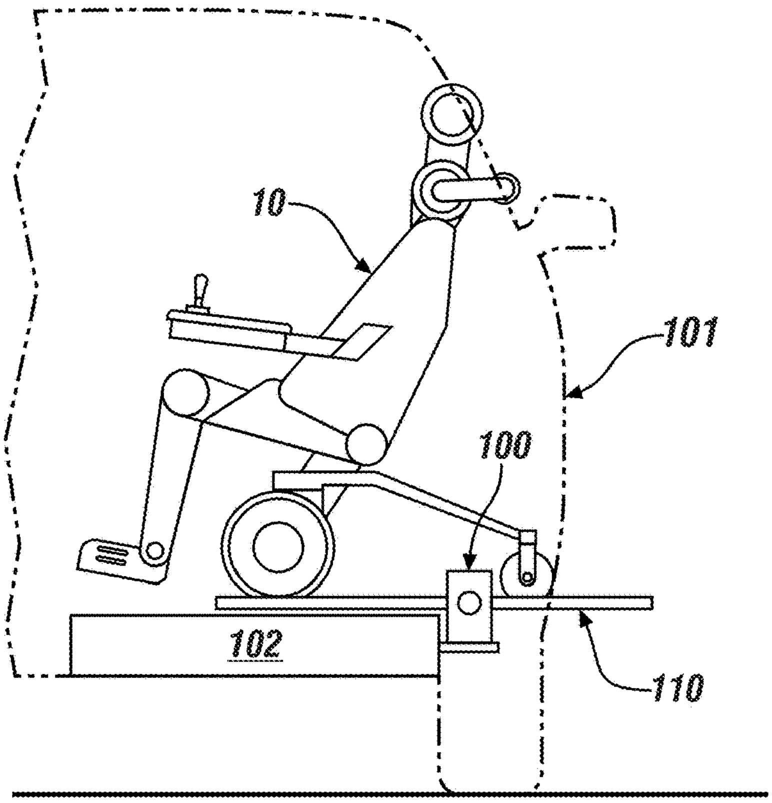

FIG. 2D depicts the deployable ramp 110 at the end of its deployment, after the deployable ramp 110 has been extended orthogonally outwardly from the edge portion 104 and has vertically pivoted such that the first end 115 of the deployable ramp 110 is secured to the edge portion 104, and the second end 116 of the deployable ramp 110 is in contact with ground level 106, which enables access by the wheelchair 10 to the deployable ramp 110.

FIGS. 3A, 3B, 3C, 3D, and 3E schematically illustrate a front view of the platform access system 100 including deployable ramp 110, as an embodiment of wheelchair 10 traverses the deployable ramp 110.

Figure 5:
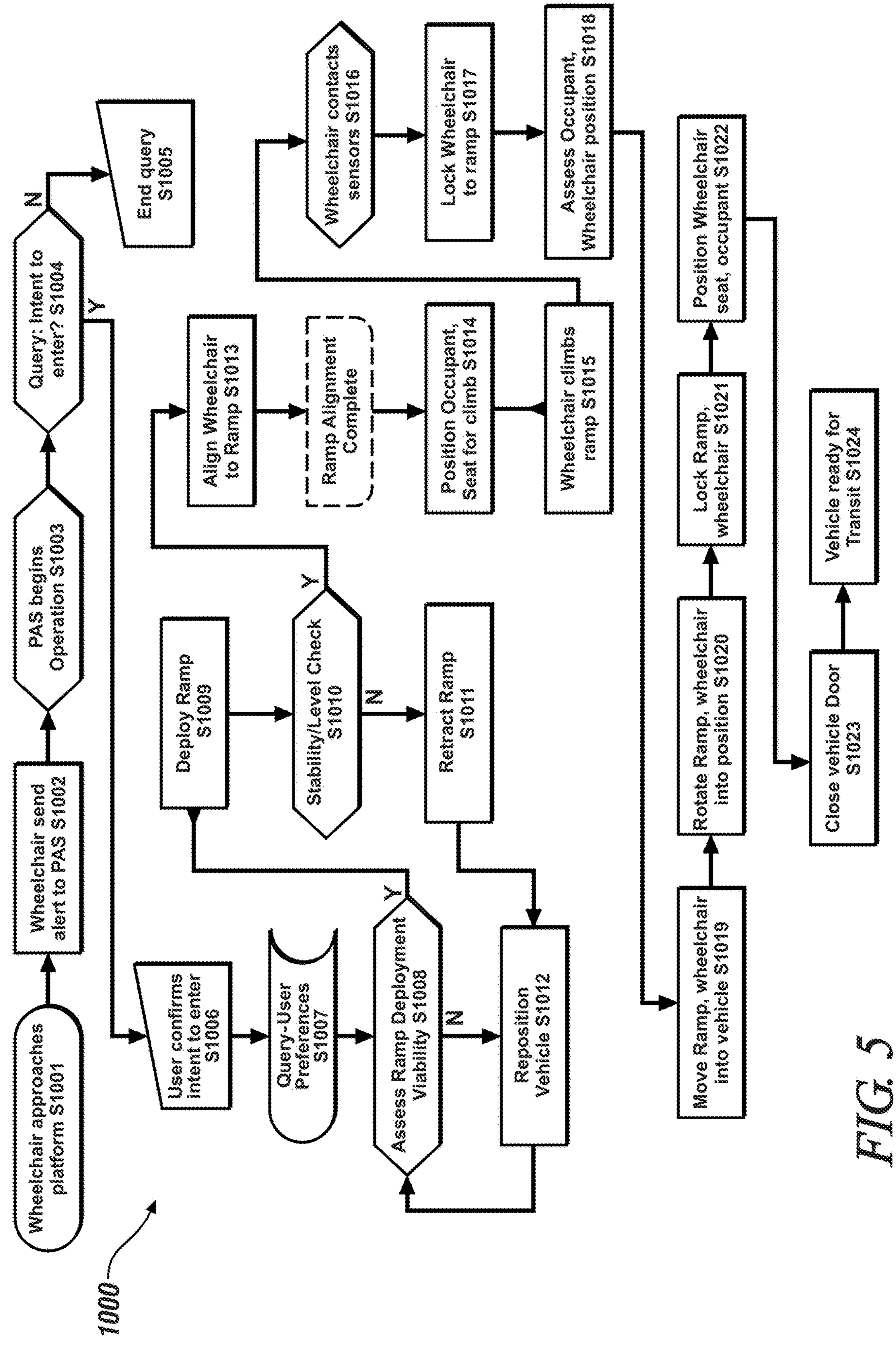
FIG. 5 schematically illustrates a wheelchair onboarding process for controlling operation of an embodiment of the platform access system and wheelchair, in accordance with the disclosure.

FIG. 5 schematically shows a wheelchair onboarding process (hereafter "process") 1000 for controlling operation of an embodiment of the platform access system (also "PAS") 100 and wheelchair 10 to onboard the wheelchair 10 onto an embodiment of the platform 102 of vehicle 101 that is described with reference to FIGS. 1, et seq. The wheelchair onboarding process 1000 may be reduced to practice as one or multiple algorithms that reside in and are executable by the ramp controller 150, or may be cloud-based algorithm (s) that are executed by the ramp controller 150, with communication and interaction with the wheelchair controller 50.

Table 1 is provided as a key wherein the numerically labeled blocks and the corresponding functions are set forth as follows, corresponding to the process 1000. The process 1000 is described in context of the platform access system 100 being employed on vehicle 101 to provide access to an embodiment of the wheelchair 10, which is one embodiment. It is appreciated that a portion of the various steps of process 1000 may not be executed when the platform access system 100 is being employed on a platform of a stationary system.

The teachings may be described herein in terms of functional and/or logical block components and/or various processing steps. Such block components may be composed of hardware, software, and/or firmware components that have been configured to perform the specified functions, including but not limited to the elements of the platform access system 100 and wheelchair 10 that are described herein.

TABLE 1

| BLOCK | BLOCK CONTENTS |
|---|---|
| 1001 | Wheelchair approaches platform |
| 1002 | Wheelchair sends alert to PAS |
| 1003 | PAS begins operation |
| 1004 | Query: Intent to enter vehicle? |
| 1005 | End query |
| 1006 | User confirms intent to enter vehicle |
| 1007 | Query user preferences |
| 1008 | Assess ramp deployment viability |
| 1009 | Deploy ramp |
| 1010 | Execute stability and level check |
| 1011 | Retract ramp |
| 1012 | Reposition vehicle |
| 1013 | Align wheelchair to ramp |
| 1014 | Position wheelchair occupant, seat for climb |
| 1015 | Wheelchair climbs ramp |
| 1016 | Wheelchair contacts sensors |
| 1017 | Lock wheelchair to ramp |
| 1018 | Assess occupant, wheelchair position |
| 1019 | Move ramp, wheelchair into vehicle |
| 1020 | Rotate ramp, wheelchair into position |
| 1021 | Lock ramp, wheelchair |
| 1022 | Position wheelchair seat, occupant |
| 1023 | Close vehicle door |
| 1024 | Vehicle ready for transit |

Execution of the process 1000 may proceed as follows. The steps of the process 1000 may be executed in a suitable order, and are not limited to the order described with reference to FIG. 5. As employed herein, the term "Y" indicates an answer in the affirmative, or "YES" or "TRUE", and the term "N" indicates an answer in the negative, or "NO" or "FALSE".

The process 1000 initiates when a wheelchair 10 approaches the platform (S1001), and sends an alert to the platform access system 100 indicating a desire for the wheelchair 10 with the occupant to enter the vehicle 101, or access the platform 102, via the platform access system 100 (S1002).

The platform access system 100 begins operation (S1003), which includes querying the occupant to determine an intent to enter the vehicle (S1004). If there is no intent to enter the vehicle (N), the query ends without further action (S1005).

When there is an intent to enter the vehicle (Y), the occupant confirms their intent (S1006), and another query is executed to determine preferences of the occupant (S1007).

Viability of deploying the ramp 110 at its present location is assessed, for example by employing on-vehicle sensors that can evaluate surface conditions at ground level (S1008). Such on-vehicle sensors may be vision, LiDAR, or radar sensors associated with the ADAS. Alternatively, or in addition, the viability of deploying the ramp 100 at its present location may be accomplished by the occupant or a third party who is able to interact with the platform access system 100, such as via a handheld device or an on-vehicle control panel.

If deployment is not presently viable (N), the vehicle 101 may be repositioned, either manually or via an advanced driver assistance system (ADAS) or another form of autonomous vehicle control (S1012). If deployment appears viable (Y), the ramp 110 may be deployed (S1009), with a subsequent check for ramp stability and level (S1010). If the check for ramp stability and level is unacceptable (N), the ramp 110 may be retracted (S1011) and the vehicle 101 may be repositioned (S1012).

When the check for ramp stability and level is acceptable (Y), the wheelchair 10 is aligned to the ramp 110 (S1013), and the occupant and/or the seat 12 are positioned for climbing the deployable ramp 110 (S1014), and the wheelchair 10 is controlled to climb the deployable ramp 110 (S1015). The wheelchair 10 climbs the deployable ramp 110 until coming into contact with or in proximity to one or more of the ramp sensors 140 (S1016), at which point the wheelchair locking mechanisms 135 are actuated to secure or lock the wheelchair 10 to the deployable ramp 110 (S1017). The location of the position(s) of the occupant and/or wheelchair 10 are assessed and adjusted as needed (S1018), and the wheelchair 10 and deployable ramp 110 are moved into the vehicle (S1019). This may include rotating and/or sliding the deployable ramp 110 into a desired position (S1020), and then locking or otherwise securing the wheelchair 10 and deployable ramp 110 into position (S1021). The seat portion 12 of the wheelchair 10 may then be adjusted to move the occupant into a desired position (S1022). The vehicle door may be closed (S1023), and the vehicle 101 may then be ready for transit (S1024).

In this manner, a wheelchair ramp is provided that uses a toothed section to allow a corresponding powered wheelchair wheel to grasp and climb the grade into a vehicle opening, and then pivot the wheelchair and user into a desired driving or riding location. The inboard side of the ramp is then clamped into place, securing the ramp, chair, and user to the vehicle.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A platform access system for a wheelchair, comprising:

a deployable ramp slidably arranged on a platform, a plurality of actuators, a sensor, and a ramp controller including a communication link;

the deployable ramp including a first elongated beam having a toothed rack portion arranged thereon;

the deployable ramp having a first end and a second end;

wherein the platform is horizontally disposed at a first elevation level;

wherein the deployable ramp is disposed at a first position on the platform;

wherein the ramp controller is operatively connected to the plurality of actuators;

wherein the ramp controller is in communication with the sensor;

wherein the deployable ramp is moveable, via one of the plurality of actuators, on the platform between the first position that is in parallel to a longitudinal axis and a second position that is orthogonal to the longitudinal axis;

wherein the second end of the deployable ramp extends outwardly from an edge portion of the platform in the second position;

wherein the deployable ramp is vertically pivotable, via one of the plurality of actuators, on the edge portion of the platform when in the second position, with the second end of the deployable ramp being disposed at a second elevation;

wherein the first end of the deployable ramp is securable, via one of the plurality of actuators, to the edge portion of the platform;

wherein the toothed rack portion of the first elongated beam is arranged to engage a sprocket of a drive wheel of a wheelchair that is disposed at the second elevation; and wherein the communication link is arranged to communicate with a communication device of the wheelchair when proximal thereto.

2. The platform access system of claim 1, further comprising:

the ramp controller including algorithmic code, the algorithmic code being executable to control the plurality of actuators to move the deployable ramp from the first position to the second position, including the plurality of actuators being operable to:

slide the deployable ramp on the platform along the longitudinal axis;

rotate the deployable ramp in a horizontal plane with the second end extending outwardly from the edge portion of the platform;

vertically pivot the deployable ramp on the edge portion of the platform with the second end of the deployable ramp disposed at the second elevation; and secure the first end of the deployable ramp to the edge portion of the platform.

3. The platform access system of claim 1, further comprising:

the deployable ramp including a wheelchair locking mechanism; and the ramp controller including algorithmic code, the algorithmic code being executable to:

communicate, via the communication link, a first command to the wheelchair to traverse from the second end of the deployable ramp to the first end of the deployable ramp via the toothed rack portion of the first elongated beam in engagement with the sprocket of the drive wheel of the wheelchair;

determine, via the sensor, that the wheelchair is proximal to the first end of the deployable ramp;

secure, via the wheelchair locking mechanism, the wheelchair to the first end of the deployable ramp;

vertically pivot, via one of the plurality of actuators, the deployable ramp to the first elevation level, with the wheelchair being disposed on the platform at the first elevation level;

rotate, via one of the plurality of actuators, the deployable ramp in a horizontal plane, with the wheelchair being disposed parallel to the longitudinal axis on the platform at the first elevation level;

slide, via one of the plurality of actuators, the deployable ramp on the platform to the first position; and secure, via the wheelchair locking mechanism, a portion of the wheelchair to the platform.

4. The platform access system of claim 3, further comprising:

the ramp controller including algorithmic code, the algorithmic code being executable to:

release, via the wheelchair locking mechanism, the portion of the wheelchair from the platform;

slide, via the one of the plurality of actuators, the deployable ramp on the platform away from the first position;

rotate, via the one of the plurality of actuators, the deployable ramp in the horizontal plane, with the wheelchair being disposed perpendicular to the longitudinal axis on the platform at the first elevation level;

vertically pivot, via the one of the plurality of actuators, the deployable ramp with the second end of the deployable ramp being disposed at the second elevation;

release, via the wheelchair locking mechanism, the wheelchair from the first end of the deployable ramp; and communicate, via the communication link, a second command to the wheelchair to traverse from the first end of the deployable ramp to the second end of the deployable ramp via the toothed rack portion of the first elongated beam in engagement with the sprocket of the drive wheel of the wheelchair.

5. The platform access system of claim 4, further comprising the ramp controller including algorithmic code, the algorithmic code being executable to:

vertically pivot, via the one of the plurality of actuators, the deployable ramp to the first elevation level subsequent to offloading the wheelchair onto a surface at the second elevation;

rotate, via the one of the plurality of actuators, the deployable ramp in the horizontal plane; and slide, via the one of the plurality of actuators, the deployable ramp on the platform to the first position.

6. The platform access system of claim 1, wherein the plurality of actuators comprises a first actuator arranged to slide the deployable ramp on the platform in parallel with the longitudinal axis, a second actuator arranged to rotate the deployable ramp on the platform; and a third actuator arranged to vertically pivot the deployable ramp on the platform.

7. The platform access system of claim 1, wherein the platform is a portion of a vehicle.

8. The platform access system of claim 1, wherein the platform is a portion of a moveable platform.

9. The platform access system of claim 1, wherein the platform is disposed on a stationary platform.

10. The platform access system of claim 1, further comprising the deployable ramp including the first elongated beam, a second elongated beam, and a cross-member;

wherein the first elongated beam is arranged coplanar with and in parallel with the second elongated beam; and wherein the first elongated beam is joined to the second elongated beam via the cross-member at the first end of the deployable ramp.

11. The platform access system of claim 1, wherein the deployable ramp is vertically pivotable upward.

12. The platform access system of claim 1, wherein the deployable ramp is vertically pivotable downward.

13. A platform access system for a personal mobility device, comprising:

a deployable ramp slidably arranged on a platform, a plurality of actuators, a sensor, and a ramp controller including a communication link;

the deployable ramp including a first elongated beam having a toothed rack portion arranged thereon;

wherein the platform is horizontally disposed at a first elevation level;

wherein the deployable ramp is disposed at a first position on the platform;

wherein the ramp controller is operatively connected to the plurality of actuators;

wherein the ramp controller is in communication with the sensor;

wherein the deployable ramp is moveable, via one of the plurality of actuators, on the platform between the first position that is in parallel to a longitudinal axis and a second position that is orthogonal to the longitudinal axis;

wherein the deployable ramp includes a second end that extends outwardly from an edge portion of the platform in the second position;

wherein the deployable ramp is vertically pivotable, via one of the plurality of actuators, on the edge portion of the platform when in the second position, with the second end of the deployable ramp being disposed at a second elevation;

wherein a first end of the deployable ramp is securable, via one of the plurality of actuators, to the edge portion of the platform;

wherein the toothed rack portion of the first elongated beam is arranged to engage a sprocket of a drive wheel of a personal mobility device that is disposed at the second elevation; and wherein the communication link is arranged to communicate with a communication device of the personal mobility device.

14. The platform access system of claim 13, further comprising:

the ramp controller including algorithmic code, the algorithmic code being executable to control the plurality of actuators to move the deployable ramp from the first position to the second position, including the plurality of actuators being operable to:

slide the deployable ramp on the platform along the longitudinal axis;

rotate the deployable ramp in a horizontal plane with the second end extending outwardly from the edge portion of the platform;

vertically pivot the deployable ramp on the edge portion of the platform with the second end of the deployable ramp disposed at the second elevation; and secure the first end of the deployable ramp to the edge portion of the platform.

15. The platform access system of claim 13, further comprising:

the deployable ramp including a wheelchair locking mechanism; and the ramp controller including algorithmic code, the algorithmic code being executable to:

communicate, via the communication link, a first command to the wheelchair to traverse from the second end of the deployable ramp to the first end of the deployable ramp via the toothed rack portion of the first elongated beam in engagement with the sprocket of the drive wheel of the wheelchair;

determine, via the sensor, that the wheelchair is proximal to the first end of the deployable ramp;

secure, via the wheelchair locking mechanism, the wheelchair to the first end of the deployable ramp;

vertically pivot, via one of the plurality of actuators, the deployable ramp to the first elevation level, with the wheelchair being disposed on the platform at the first elevation level;

rotate, via one of the plurality of actuators, the deployable ramp in a horizontal plane, with the wheelchair being disposed parallel to the longitudinal axis on the platform at the first elevation level;

slide, via one of the plurality of actuators, the deployable ramp on the platform to the first position; and secure, via the wheelchair locking mechanism, a portion of the wheelchair to the platform.

16. The platform access system of claim 15, further comprising:

the ramp controller including algorithmic code, the algorithmic code being executable to:

release, via the wheelchair locking mechanism, the portion of the wheelchair from the platform;

slide, via the one of the plurality of actuators, the deployable ramp on the platform away from the first position;

rotate, via the one of the plurality of actuators, the deployable ramp in the horizontal plane, with the wheelchair being disposed perpendicular to the longitudinal axis on the platform at the first elevation level;

vertically pivot, via the one of the plurality of actuators, the deployable ramp with the second end of the deployable ramp being disposed at the second elevation;

release, via the wheelchair locking mechanism, the wheelchair from the first end of the deployable ramp; and communicate, via the communication link, a second command to the wheelchair to traverse from the first end of the deployable ramp to the second end of the deployable ramp via the toothed rack portion of the first elongated beam in engagement with the sprocket of the drive wheel of the wheelchair.

17. The platform access system of claim 16, further comprising the ramp controller including algorithmic code, the algorithmic code being executable to:

vertically pivot, via the one of the plurality of actuators, the deployable ramp to the first elevation level subsequent to offloading the wheelchair onto a surface at the second elevation;

rotate, via the one of the plurality of actuators, the deployable ramp in the horizontal plane; and slide, via the one of the plurality of actuators, the deployable ramp on the platform to the first position.

18. The platform access system of claim 13, wherein the plurality of actuators comprises a first actuator arranged to slide the deployable ramp on the platform in parallel with the longitudinal axis, a second actuator arranged to rotate the deployable ramp on the platform; and a third actuator arranged to vertically pivot the deployable ramp on the platform.

19. A passenger access system for a vehicle, the system comprising:

a wheelchair including a seat portion, an extendable post, a wheeled base portion, a sensor, and a first controller; and a deployable ramp and a second controller;

wherein the seat portion is coupled to the wheeled base portion via the extendable post;

wherein a first end of the extendable post is pivotably coupled to the wheeled base portion at a first joint;

wherein a second end of the extendable post is pivotably coupled to the seat portion at a second joint;

wherein the wheeled base portion includes a plurality of wheels arranged on a chassis, a power pack, and an electric motor;

wherein one of the plurality of wheels includes a drive wheel;

wherein the drive wheel is coupled to the electric motor;

wherein the drive wheel includes a sprocket;

wherein the deployable ramp includes an elongated beam having a rack portion arranged thereon;

wherein the sprocket of the drive wheel is meshingly engageable with the rack portion of the elongated beam of the deployable ramp;

wherein the first controller is arranged to monitor, via the sensor, a location of the wheelchair;

wherein the first controller is arranged to control the electric motor to rotate the sprocket of the drive wheel;

wherein the first controller is arranged to control the extendable post;

wherein the first controller is arranged to control the first joint between the wheeled base portion and the extendable post;

wherein the first controller is arranged to control the second joint between the seat portion and the extendable post;

wherein the first controller is arranged to control the extendable post to control a position of the seat portion; and wherein, when the sprocket of the drive wheel engages the deployable ramp, the first controller:

controls the electric motor to rotate the sprocket of the drive wheel to meshingly engage the rack portion of the elongated beam of the deployable ramp to cause the wheelchair to traverse the deployable ramp, controls the second joint to orient the seat portion in an upright state as the wheelchair is traversing the deployable ramp, and controls the first joint, the second joint, and the extendable post to control the position of the seat portion as the wheelchair is traversing the deployable ramp.

20. The passenger access system of claim 19, comprising:

wherein the first controller communicates a query, via a wireless communication system, with the second controller; and wherein the second controller deploys the deployable ramp in response to the query from the first controller.

* * * * *